United States Patent Office 3,499,867
Patented Mar. 10, 1970

3,499,867
STABILIZED POLYAMIDE COMPOSITION
Naofumi Nakamura, Takatsuki-shi, and Yasufusa Hotta, Tadayoshi Murakami, Yoshiharu Shimpo, Kuniomi Etoh, and Yoshikazu Shirasaki, Tsuruga-shi, Japan, assignors to Toyo Boseki Kabushiki Kaisha, Osaka, Japan, a corporation of Japan
No Drawing. Filed June 13, 1966, Ser. No. 556,855
Claims priority, application Japan, June 22, 1965, 40/36,756; Dec. 4, 1965, 40/74,745
Int. Cl. C08g 51/62
U.S. Cl. 260—45.75
8 Claims

ABSTRACT OF THE DISCLOSURE

A polyamide composition of improved thermal stability comprising an aliphatic or aromatic polyamide and from about 0.001 to about 1% by weight of a pre-formed copper complex prepared by heating a divalent copper salt at a temperature of from 100 to 140° C. with a lactam moiety having from about 5 to about 12 carbon atoms or an amino-saturated aliphatic carboxylic acid containing from about 5 to about 12 carbon atoms.

Optionally, styrenated phenol, an organic amine and/or a nitrogen-containing halide may be added for increased protection.

---

This invention relates to a polyamide composition having resistance to thermal deterioration.

Generally, a polyamide is sensitive to oxidation and when subjected to an increased temperature (for instance, a high temperature as is often encountered by a polyamide structure employed in reinforcing rubber during its service) in the presence of oxygen, there are such defects which result in the degree of polymerization being lowered and discoloration, brittleness or causing at times a crosslinking and curing. For the purpose of preventing such thermal deterioration of a polyamide, heretofore various methods for stabilizing a polyamide have been proposed.

One of the hitherto proposed and recognized as effective methods is to blend a small amount of a heavy metal compound, inter alia a copper compound with a polyamide (for instance, French Patent No. 906,893), but there is still a room for improvement from the practical viewpoint.

The reason why a copper compound is effective is as explained in J. R. Kochi in J.A.C.S., 84, 1572, a peroxide produced in a polyamide is decomposed by contact with Cu$^I$, moreover, since copper per se reversibly changes from monovalent⇌divalent, the reason appears to be due to a functional mechanism wherein the half-value period as a thermal stabilizer is long as shown in the following formulae, (1) ROOH+Cu$^I$X→RO·+XCu$^{II}$OH
(2) RO·+RH→ROH+R·
(3) R·+XCu$^{II}$OH→ROH+Cu$^I$X wherein R stands for a hydrocarbon residual and X denotes an anion.

We also have confirmed by a kinetic study about the oxygen-uptake of a polyamide blended with the copper salt and peroxide decomposition with reference to various copper salts.

Therefore, in order that the added copper compound may develop thermal stability, it must be dissolved in the form of molecule or ion in a polyamide. If the copper compound decomposes, and separates metal copper or copper oxide, the thermal stability will completely disapear. Not only that, but also the separate metal copper or copper oxide will result in the filament breaking upon spinning and also in staining of the filament. Accordingly, upon selecting a copper compound to be added to a polyamide, consideration of heat stability of the compound per se becomes a big problem. Whereas the high temperature heat stability in a molten polyamide of each of the hitherto proposed copper compounds is insufficient, they tend to easily pyrolyze and separate metal copper or copper oxide and cannot be called satisfactory.

Yet another problem associated with the use of a copper compound, is the matter of corrosion of the apparatus employed in the process. Normally a copper compound especially at high temperatures corrodes a metal whose ionizing inclination is larger than or identical with that of copper by ion exchange, and an anion (or ligand) of the copper compound corrodes the metal by elution in the form of a salt. It goes without saying that such phenomenon would tend to lower the durability of the apparatus when one adds copper compound to a polyamide, in concomitance with the corroding reaction metal copper or other metal ion is mixed with the polyamide, inviting trouble at the time of spinning and drawing which can result in a deterioration of the filament quality.

Accordingly, a main object of this invention is to provide a novel polyamide composition having an improved resistance to thermal deterioration. Another object of this invention is to provide a novel polyamide composition having an improved resistance to thermal deterioration and which has inhibited corrosion characteristics. Other objects and advantages of this invention will become apparent from the following description.

It has been found that a group of copper complexes, namely a complex of a lactam having 5–12 carbon atoms and copper and a complex of ω-amino acid having 5–12 carbon atoms and copper are excellent as thermal stabilizer of polyamide and the group per se is sufficiently stable at a temperature suitable for melt formation of a polyamide or a temperature higher than that employed therefore. Also it has been found that for the purpose of preventing thermal deterioration of a polyamide, these complexes may be used in an amount calculated as copper based on the polyamide of 0.001 to 1% by weight.

The copper complex used in this invention can be easily prepared by heating a mixture of a copper salt and a lactam having 5–12 carbon atoms or ω-amino acid having 5–12 carbon atoms to an elevated temperature (e.g. 100–140° C.). The preferable copper salt is soluble in a lactam or amino acid used. As examples thereof, there are inorganic copper salts such as sulfate, chloride and bromide and organic copper salts such as acetate, stearate and salicylate. The preferable lactam and ω-amino acid has 5–8 carbon atoms including valerolactam caprolactam, enantholactam, capryllactam, ω-amino valeric acid, ω-amino caproic acid, ω-amino enanthic acid and ω-amino caprylic acid. When the preparation of the copper complex is exemplified with reference to ε-caprolactam, it is as follows.

To 100 parts by weight of ε-caprolactam were added 20 parts by weight of cupric chloride. The obtained solution was heated to about 120° C. The solution was kept at that temperature for 2 hours. During the heating, the solution gradually changed to green. To the green viscous solution thus obtained benzene was added and when the mixture was left to stand, plate-like and aculeate crystals were obtained. From the obtained crystals, we isolated 4 kinds of copper complexes having different colors. The melting points of these complexes were within the range of 185–186° C. The blending of the copper complex with a polyamide may be carried out before, during or after the polymerization of a polyamide.

For the object of this invention, the copper complex does not have to be purified and isolated. It is also possible to add the solution obtained by said reaction wherein the complex coexists with excess ligand (i.e. lactam or amino acid) to be a polyamide material.

It has been found that it may be advantageous to add the complex together with styrenated phenol in an amount of up to 600% by weight, especially 50–600% by weight based on the weight of the complex. In such cases it is possible to blend the complex as a solution in styrenated phenol with a polyamide. Further, it is possible that the preparation of said complex is carried out in the presence of styrenated phenol and the obtained reaction solution is added to a polyamide.

The lactam-copper complex and the amino acid-copper complex can effectively prevent the thermal deterioration of polyamide. The copper complexes used in this invention have a heat stability as a thermal stabilizer of a polyamides superior to heat stability of hitherto known copper compounds and hardly separates metal copper or copper oxide in a molten polyamide.

In a preferable embodiment of this invention, said copper complex is blended with polyamide together with a quaternary organic base halide in an amount of up to 300% by weight, preferably 50 to 300% by weight based on the weight of said complex. It has been found that a quaternary organic base halide effectively inhibits the metal corrosion of the copper complex.

As a quaternary organic base halide, one which has a quaternary nitrogen atom, one or two of hydrocarbon radicals bonded therewith are alkyl radicals having 10–22 carbon atoms, is preferable. As examples of said halide, there are cetyltrimethylammonium bromide, cetylpyridinium bromide, stearyltrimethylammonium chloride and distearyldimethylammonium iodide. As a halogen, idine is most effective and the effect tends to decrease in the sequence of bromine and chlorine. However, as shown in the examples, in the cast of using chloride, the effect of preventing corrosion is good.

It has also been found that the corrosion prevention action of a quaternary organic base halide is synergistically enhanced by a primary, secondary or tertiary amine. Proper organic amines have relatively high boiling points. Amines whose boiling points are lower than the melting point of polyamide by more than 100° C. cannot be employed, however since they are apt to vaporize while polyamide is melt formed.

As examples of useful organic amines, there may be cited quinoline, morpholin, piperadine, N,N-dimethylaniline, diethyltriamine, hexamethylenediamine, monoethanolamine, diamino-diphenylmethane, palmitylamine, and stearylamine, however, higher aliphatic amines having high boiling points are preferable. The useful amount of amine may be up to 300% by weight, particularly 50–300% by weight based on the copper complex.

A polyamide which can be stabilized by this invention includes, aliphatic polyamides obtained from lactams, hexamethylenediamine adipate and/or hexamethylenediamine sebacate; aromatic polyamides obtained from meta-xylylenediamine adipate, meta-xylylenediamine sebacate, meta-para-xylylenediamine adipate (para content within 50%), hexamethylenediamine terephthalate or a mixture thereof or a mixture thereof with aliphatic nylon salts; and similar polyamides thereto.

It should be understood that when the copper compound is used as a thermal stabilizer for these polyamides, alkali metal halides which have hitherto been used in combination such as, for instance, potassium iodide, sodium iodide, potassium bromide and sodium bromide may be used together with the copper complex of this invention.

The present invention may be further illustrated by the following examples. Unless particularly defined, the term parts express parts by weight.

EXAMPLE 1

A solution consisting of 100 parts of caprolactam and 13 parts of cupric chloride was heated to 120° C. with stirring for 2 hours. 0.28 part of the obtained green transparent solution was uniformly mixed with 100 parts of molten 6-nylon (number average molecular weight: about 22,000). By melt spinning at a spinning temperature of 300° C. and a winding speed of 500 m./min. and by drawing at 185° C. with a draw ratio of 4.55 of said mixture, a white filament having a tensile strength of 8.9 g./d. and a break elongation of 21% was obtained. After the filament was exposed in air at 180° C. for 20 hours, the tensile strength of it was 7.8 g./d., which means that lowering of tensile strength due to this exposure was about 12%.

The filament prepared under the same conditions except the copper complex was not contained showed loss of tensile strength due to exposure in air at 180° C. for 20 hours of about 85%.

EXAMPLE 2

A solution consisting of 100 parts of ω-aminocaproic acid and 20 parts of cupric acetate was heated to 130° C. for 2 hours. After the reaction mixture was cooled, it was poured into benzene. As a result green aculeate crystals were obtained. 0.3 part of this complex was added to 100 parts of caprolactam and to the mixture was added 0.3 part of water, 0.3 part of acetic acid and 0.1 part of potassium iodide. The mixture was subjected to a polymerization temperature of 260° C. for 15 hours, as a result 6-nylon having a number average molecular weight of 15,000 wherein was incorporated the copper complex was obtained. From this polymer composition, by melt spinning at 280° C. and a winding speed of 480 m./min. and by drawing at a drawing temperature of 185° C. and a draw ratio of 4.55, filament was prepared. The filament breaking of it was 0.01 time an hour. The loss of tensile strength of the filament due to exposure in air at 180° C. for 20 hours was 10%.

For the sake of comparison, the foregoing operations were repeated except 0.2 part of cupric acetate was used instead of 0.3 part of the copper complex. In this case, the filament breaking was 0.1 time an hour and in the nozzle slight precipitation of metal copper was observed. The loss of tensile strength of the filament due to exposure in air at 180° C. for 20 hours was 22%.

EXAMPLE 3

A solution of 12.5 parts of cupric chloride in a mixture of 70 parts of caprolactam and 30 parts of styrenated phenol was heated with stirring at 120° C. for 2 hours to give a transparent dark green solution. 0.4 part of said solution was mixed with 100 parts of chips of polycaproamide (number average molecular weight: 21,000). The chips were melted and extruded at 295° C. and a winding speed of 450 m./min. to form filament. Said filament was drawn at a drawing temperature of 185° C. and a draw ratio of 4.55. The loss of (tensile) strength of the obtained filament due to exposure in air at 180° C. for 20 hours was 8%.

EXAMPLE 4

From chips of nylon 66 (number average molecular weight: 20,000) wherein 0.3 part of the green transparent solution of the lactam-copper complex in Example 1 was mixed with 100 parts of the nylon chips, by melt spinning at a spinning temperature of 290° C. and a winding speed of 400 m./min. and by drawing at 185° C. and a draw ratio of 4.55, filament was prepared. The lowering of tensile strength of the obtained filament due to exposure in air at 180° C. for 20 hours was 10%.

The foregoing operations were repeated except chips of poly (m-xylylenediamine adipate) (number average molecular weight: 21,000) were used instead of the chips nylon 66 and the melt spinning was carried out at 290° C. and a winding speed of 400 m./min. The loss of tensile strength of the obtained filament due to exposure in air at 180° C. for 20 hours was 9%.

EXAMPLE 5

A solution of 20 parts of cupric chloride in 100 parts of caprolactam was heated to 120° C. for 2 hours. To the obtained green solution was added excess benzene to salt out green crystals and the crystals were separated. 20 parts of the obtained green crystalline complex were dissolved in 100 parts of styrenated phenol. The obtained solution was heated to 250° C. for 1 hour, however, no precipitation of metal copper was recognized.

Whereas, a solution of 20 parts of cupric salicylate in 100 parts of styrenated phenol was heated to 250° C., precipitation of metal copper started after 2 minutes.

20 parts of said caprolactam-copper complex and 20 parts of cetyltrimethylammonium chloride were dissolved in 100 parts of styrenated phenol. Into 20 g. of said solution a 3 x 0.7 x 0.1 cm. stainless steel (SUS 33) piece was immersed and heated to 260° C. for 24 hours. The weight loss of the stainless steel was 0.10%.

In the similar test concerning a solution of 20 parts of the caprolactam-copper complex in 120 parts of styrenated phenol, the weight loss of the stainless steel piece was 2.83%, and the surface of the sample slightly corrode.

Molten polycaproamide (number average molecular weight: 22,500) was mixed with 0.3 part based on 100 parts of the polymer of said solution of 20 parts of the caprolactam-copper complex and 20 parts of cetyltrimethylammonium chloride in 100 parts of styrenated phenol. From said melt, by melt spinning at a spinning temperature of 295° C. and a winding speed of 490 m./min. and by drawing at a drawing temperature of 185° C. and a draw ratio of 4.55, white filament was prepared. The loss of tensile strength of this filament due to exposure in air at 180° C. for 20 hours was 11%.

EXAMPLE 6

To 100 parts of caprolactam were added 16 parts of cupric chloride and 28 parts of cetyltrimethylammonium bromide, and the mixture was heated to 120° C. with stirring for 2 hours. In 20 g. of the obtained transparent green solution a thin piece of SUS 33 (3 x 0.7 x 0.1 cm.) was heated to 260° C. for 24 hours. The weight loss of the SUS material was 0.15%.

To a melt of polycaproamide (number average molecular weight: 22,500) was mixed 0.2 part of said green solution based on 100 parts of the polymer. From said mixture, by melt spinning at a spinning temperature of 295° C. and a winding speed of 510 m./min. and by drawing at 185° C. and a draw ratio of 4.55, a white filament was prepared. The loss of tensile strength of this filament due to exposure in air at 180° C. for 20 hours was 12%.

EXAMPLE 7

A solution consisting of 100 parts of caprolactam, 20 parts of cupric chloride, 35 parts of cetyltrimethylammonium bromide and 25 parts of styrenated phenol was heated to 120° C. with stirring for 3 hours to give a dark red transparent solution. A part of said solution was maintained at 260° C. for 24 hours, however, there was no recognizable separation of metal copper and copper oxide. When a thin piece of SUS 33 was heated to 260° C. for 24 hours in 20 g. of said solution, no separation of metal copper was observed and the weight loss of the SUS 33 was 0.08%.

A melt of polycaproamide (number average molecular weight: 21,500) was mixed with 0.2 part of said dark red solution. From the melt, by melt spinning at a spinning temperature of 295° C. and a winding speed of 500 m./min. and by drawing at a drawing temperature of 185° C. and a draw ratio of 4.55, a white filament was prepared. The loss of tensile strength of this filament due to exposure in air at 180° C. for 20 hours was 12%.

Chips of nylon 66 (number average molecular weight: 19,000) were mixed with 0.25 part of said dark red solution of the complex. From the chips, by spinning at a spinning temperature of 290° C. and a winding speed of 530 m./min. and by the drawing whose conditions were same as those of the above, white filament was obtained. The loss of tensile strength of the filament due to exposure in air at 180° C. for 20 hours was 11%.

Chips of poly(m-xylylenediamine adipate) (number average molecular weight: 19,500) were mixed with 0.25 part based on 100 parts of the polymer of said dark red solution of the complex. From the chips, by melt spinning at a spinning temperature of 280° C. and a winding speed of 450 m./min., a white filament was prepared. The drawing conditions were same as those of the foregoing. The loss of tensile strength of the filament due to exposure in air at 180° C. for 20 hours was 10%.

EXAMPLE 8

A solution consisting of 100 parts of ω-aminocaproic acid, 20 parts of cupric acetate, 30 parts of stearyltrimethylammonium chloride was heated to 130° C. with stirring for 2 hours. 0.2 part of the obtained complex solution was added to 100 parts of ε-caprolactam, and the mixture was further mixed with 0.3 part of water, 0.3 part of acetic acid and 0.1 part of potassium iodide. The resultant mixture was maintained at a polymerization temperature of 260° C. for 15 hours, and a polymer having a number average molecular weight of 15,000 was obtained. By spinning said polymer at a spinning temperature of 290° C. and a winding sped of 530 m./min., a white filament was obtained. The drawing conditions employed were same as those of the foregoing examples. The loss of tensile strength of the filament due to exposure in air at 180° C. for 20 hours was 10%.

Said spinning operations were continued for one week, but no corrosion was observed at the nozzle. On the contrary, in the case wherein stearyltrimethylammonium chloride was not blended, a slight corrosion was observed at the nozzle.

EXAMPLE 9

A solution consisting of 100 parts of caprolactam, 20 parts of cupric chloride, 40 parts of cetyltrimethylammonium iodide and 25 parts of styrenated phenol was heated to 120° C. with stirring for 2 hours to give a dark red transparent solution. In 20 g. of said solution a thin SUS 33 piece was immersed and the solution was heated to 260° C. for 24 hours, however, no separation of metal copper was observed. The weight loss of the SUS material due to this treatment was only 0.05%. A melt of nylon 6 (number average molecular weight 20,000), was mixed with 0.2 part of said dark red solution based on 100 parts of the polymer. The melt was extruded at a spinning temperature of 295° C. and a winding speed of 450 m./min. as filament. Subsequently, the filament was drawn as in the preceding examples, and a white filament was obtained. The loss of tensile strength of the filament due to exposure in air at 180° C. for 20 hours was about 10%.

EXAMPLE 10

From the components whose amounts (parts by weight) are shown in the following Table 1, 4 kinds of stabilizer solutions A, B, C and D were prepared.

TABLE 1

| Solution | A | B | C | D |
| --- | --- | --- | --- | --- |
| Caprolactam | 100 | 120 | 105 | 125 |
| Cupric chloride | 10 | 10 | 10 | 10 |
| Cetyltrimethylammonium chloride | 20 | 0 | 20 | 0 |
| Palmityl amine | 5 | 5 | 0 | 0 |
| Total | 135 | 135 | 135 | 135 |

In each case, a solution of 10 parts of cupric chloride in 100 parts of lactam was heated to 120° C. with stirring for 2 hours, and to said solution the residual cetyltrimethylammonium chloride, palmityl amine and/or lactam were added. A thin stainless steel piece (3 x 0.7 x 0.1 cm.)

was immersed in each solution, and the solution was heated to 260° C. in a nitrogen atmosphere for 24 hours. The kind, initial weight, final weight, loss of weight (in grams) and loss of weight (in percent) of the stainless steel were shown in Table 2.

TABLE 2.—CORRODING ACTION OF STABILIZER SOLUTION ON STAINLESS STEEL

| Stainless steel | Stabilizer composition | Initial weight (g.) | Final weight (g.) | Loss of weight (g.) | Loss of weight (percent) |
|---|---|---|---|---|---|
| SUS 21 | A | 1.8248 | 1.8003 | 0.0245 | 1.34 |
|  | D | 1.7391 | 1.5848 | 0.1543 | 9.87 |
| SUS 27 | A | 1.7084 | 1.7072 | 0.0012 | 0.07 |
|  | D | 1.8527 | 1.8464 | 0.0063 | 6.34 |
| SUS 33 | A | 1.7832 | 1.7829 | 9.0003 | 0.02 |
|  |  | 1.7756 | 1.7752 | 0.0004 |  |
| SUB 33 | B | 1.8148 | 1.8048 | 9.0100 | 0.53 |
|  |  | 1.7952 | 1.7866 | 0.0092 |  |
| SUS 33 | C | 1.7817 | 1.7792 | 0.0025 | 0.21 |
|  |  | 1.7901 | 1.7883 | 0.0018 |  |
| SUS 33 | D | 1.7913 | 1.7376 | 0.0537 | 2.95 |
|  |  | 1.8019 | 1.7526 | 0.0523 |  |

A melt of polycaproamide (number average molecular weight: 19,300) was mixed with said solution A in an amount of 0.32 part based on 100 parts of the polymer. By melt spinning the melt at a spinning temperature of 290° C. and a winding speed of 500 m./min., and by drawing same as in the preceding examples, a white filament was prepared. The loss of tensile strength of the filament due to exposure in air at 180° C. was 9%. Said spinning operations are continued for one week, but no corrosion was observed at the nozzle.

EXAMPLE 11

By carrying out the reaction same as in the preceding Example 10, from 100 parts of caprolactam and 10 parts of cupric chloride, a complex solution was prepared, to which were added 20 parts of cetyltrimethylammonium chloride and 5 parts of organic amines shown in the following Table 3, whereby stabilizer solutions were prepared.

The result of corrosion tests by the stabilizer solution of SUS 33 carried out as in Example 10 and the loss of tensile strength due to exposure in hot air of polycaproamide filament prepared as in Example 10 by using each stabilizer solution were shown in the following Table 3.

TABLE 3

| Organic amine | Initial weight, g. | Final weight, g. | Loss of weight, percent | Loss of tensile strength after exposure at 180° C. for 20 hours, percent |
|---|---|---|---|---|
| Palmityl amine | 1.8014 | 1.8010 | 0.02 | 9 |
| Stearyl amine | 1.8235 | 1.8231 | 0.02 | 11 |
| Monoethanolamine | 1.8001 | 1.7911 | 0.05 | 10 |
| Morpholine | 1.8333 | 1.8229 | 0.02 | 11 |
| None | 1.7945 | 1.7923 | 0.12 | 12 |

We claim:
1. A polyamide composition comprising a polyamide selected from the group consisting of aliphatic polyamides and aromatic polyamides and from about 0.001 to about 1% by weight of at least one pre-formed copper complex selected from the group consisting of a lactam-copper complex, wherein each lactam has from about 5 to about 12 carbon atoms and the copper is employed in the form of a divalent salt selected from the group consisting of sulfate, chloride, bromide, acetate and salicylate salts and an amino-saturated aliphatic carboxylic acid-copper complex wherein each acid has from about 5 to about 12 carbon atoms and the copper is employed in the form of a divalent salt selected from the salts consisting of the sulfate, chloride, bromide, acetate and salicylate salts, said percentage being based on the polyamide and calculated as copper in the complex, said copper complex being prepared by heating said copper salt with the lactam or amino-saturated aliphatic carboxylic acid moiety in an amount sufficient to complex therewith at a temperature of from 100 to 140° C.

2. A composition in accordance with claim 1 characterised in that the composition further contains up to 300% by weight based on the copper complex, of an organic quaternary nitrogen-containing halide wherein one or two of the organic radicals is an alkyl radical having 10–22 carbon atoms each.

3. A composition in accordance with claim 2 wherein the quaternary nitrogen containing halide is present in an amount ranging from 50 to 300% by weight based on the copper complex.

4. A composition in accordance with claim 1 characterised in that the composition further contains 50 to 300% by weight based on the copper complex of an organic quaternary nitrogen-containing halide wherein one or two of the organic radicals is an alkyl radical having 10–22 carbon atoms each and up to 100% by weight based on the copper complex, of an organic amine selected from the group consisting of heterocyclic amines and aliphatic amines having a boiling point not lower than 100° C. below the melting point of the polyamide.

5. A composition in accordance with claim 1 wherein the composition further contains up to 600% by weight based on the copper complex, of styrenated phenol.

6. A composition in accordance with claim 2 wherein the composition further contains up to 600% by weight based on the copper complex, of styrenated phenol.

7. A composition in accordance with claim 3 wherein the composition further contains up to 600% by weight based on the copper complex, of styrenated phenol.

8. A composition in accordance with claim 4 wherein the composition further contains up to 600% by weight based on the copper complex, of styrenated phenol.

References Cited

UNITED STATES PATENTS 2,705,277   3/1955   Stamatoff _____ 260—45.7

FOREIGN PATENTS 839,067   6/1960   Great Britain.
922,706   4/1963   Great Britain.
932,066   7/1963   Great Britain.
989,272   4/1965   Great Britain.

DONALD E. CZAJA, Primary Examiner

V. P. HOKE, Assistant Examiner

U.S. Cl. X.R.

260—45.9, 45.95

UNITED STATES PATENT OFFICE
CERTIFICATE OF CORRECTION

Patent No. 3,499,867                                    March 10, 1970

Naofumi Nakamura et al.

It is certified that error appears in the above identified patent and that said Letters Patent are hereby corrected as shown below:

Column 7, TABLE 2, under the heading "Loss of Weight (g.)" line 5, "9.0003" should read -- 0.0003 --; under the same heading, line 7, "9.0100" should read -- 0.0100 --; same table, under the heading "Loss of Weight (percent)" line 7, "0.21" should read -- 0.12 --.

Signed and sealed this 8th day of December 1970.

(SEAL)
Attest:

Edward M. Fletcher, Jr.                           WILLIAM E. SCHUYLER, JR.
Attesting Officer                                         Commissioner of Patents